United States Patent
Giannini (10) Patent No.: US 11,603,195 B2
(45) Date of Patent: Mar. 14, 2023

(54) AIRCRAFT HAVING HYBRID PROPULSION

(71) Applicant: Aurora Flight Sciences Corporation, Manassas, VA (US)

(72) Inventor: Francesco Giannini, Falls Church, VA (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 296 days.

(21) Appl. No.: 16/842,305

(22) Filed: Apr. 7, 2020

(65) Prior Publication Data

US 2021/0309351 A1 Oct. 7, 2021

(51) Int. Cl.
*B64C 29/00* (2006.01)
*B60L 53/24* (2019.01)
*B60K 6/48* (2007.10)
*B64C 11/28* (2006.01)
*B64D 27/02* (2006.01)

(52) U.S. Cl.
CPC .......... *B64C 29/0083* (2013.01); *B60K 6/48* (2013.01); *B60L 53/24* (2019.02); *B64C 11/28* (2013.01); *B64D 2027/026* (2013.01)

(58) Field of Classification Search
CPC ... B64C 29/00; B64C 29/008; B64C 29/0016; B64C 27/22; B64C 27/30; B64C 29/0083; B64C 29/0033; B64C 11/28; B64C 11/48; B64D 27/00; B64D 27/02; B64D 2027/026; B64D 27/24; B64D 31/02; B64D 27/12; B64D 27/10; B64D 31/06; B64D 27/04; B60L 53/24; B60K 6/48
See application file for complete search history.

(56) References Cited

U.S. PATENT DOCUMENTS

| | | | |
|---|---|---|---|
| 2,936,967 A | 5/1960 | Dancik | |
| 3,430,894 A | 3/1969 | Strand et al. | |
| 8,469,306 B2 | 6/2013 | Kuhn, Jr. | |
| 10,214,285 B2* | 2/2019 | McCullough | B64D 1/08 |
| 10,392,106 B2* | 8/2019 | Vondrell | B64D 27/12 |
| 11,124,289 B2* | 9/2021 | McCullough | G05D 1/0858 |
| 2013/0099065 A1* | 4/2013 | Stuhlberger | B64C 29/0033 903/902 |
| 2015/0266571 A1* | 9/2015 | Bevirt | B64D 27/24 244/7 C |
| 2017/0029131 A1 | 2/2017 | Steinwandel et al. | |

(Continued)

OTHER PUBLICATIONS

European Patent Office, "Extended European Search Report," dated Aug. 13, 2021 in connection with European Patent Application No. 21166476.8, 9 pages.

*Primary Examiner* — Joshua J Michener
*Assistant Examiner* — Cindi M Curry
(74) *Attorney, Agent, or Firm* — Hanley, Flight & Zimmerman LLC (57) ABSTRACT

Aircraft having hybrid propulsion are disclosed. A disclosed example propulsion system for an aircraft. The propulsion system includes an engine, an electric motor, a first propeller mounted to an aerodynamic body of the aircraft, the first propeller driven by the engine, a second propeller mounted to the aerodynamic body and positioned outboard relative to the first propeller, the second propeller driven by the electric motor, and a selector to control whether the propulsion system is operated in a hybrid mode in which the first and second propellers are driven.

18 Claims, 7 Drawing Sheets

(56) References Cited

U.S. PATENT DOCUMENTS

| | | |
|---|---|---|
| 2017/0197700 A1 | 7/2017 | Wainfan |
| 2017/0327219 A1* | 11/2017 | Alber ...................... B64C 29/02 |
| 2018/0065740 A1* | 3/2018 | Vondrell ............. B64C 29/0033 |
| 2018/0065741 A1* | 3/2018 | Vondrell ............... B64C 11/001 |
| 2018/0346112 A1* | 12/2018 | Chiang ............... B64C 29/0033 |
| 2020/0017228 A1* | 1/2020 | Combs ................... B64D 31/02 |

* cited by examiner

AIRCRAFT HAVING HYBRID PROPULSION

FIELD OF THE DISCLOSURE

This disclosure relates generally to aircraft and, more particularly, to aircraft having hybrid propulsion.

BACKGROUND

In recent years, vertical takeoff and landing (VTOL) aircraft have become more commonly operated in areas in which takeoff and landing is limited to a relatively small area and/or distance. Accordingly, some known VTOL aircraft employ a tilt wing that extends across a fuselage and rotates relative to the fuselage to vary a direction of thrust.

SUMMARY

An example propulsion system for an aircraft includes an engine, an electric motor, a first propeller mounted to an aerodynamic body of the aircraft, the first propeller driven by the engine, a second propeller mounted to the aerodynamic body and positioned outboard relative to the first propeller, the second propeller driven by the electric motor, and a selector to control whether the propulsion system is operated in a hybrid mode in which the first and second propellers are driven.

An example method of providing propulsion to an aircraft includes driving, via an engine, first propellers of an aerodynamic body, and selectively driving, via at least one electric motor, second propellers of the aerodynamic body based on whether the aircraft is operating in a hybrid mode, the second propellers are positioned outboard from the first propellers.

An example propulsion system for a tilt wing of an aircraft includes a wing body, first propellers mounted on the tilt wing, the first propellers to be driven by an engine, second propellers mounted on the tilt wing, the second propellers positioned outboard relative to the first propellers, the second propellers to be driven by at least one electric motor, and a selector to control whether the propulsion system is operated in a hybrid mode in which the first and second propellers are driven.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft having hybrid propulsion are disclosed. Some known vertical takeoff and landing (VTOL) aircraft implement tilt wings for hovering operations. In particular, a tilt wing that pivots relative to a corresponding fuselage is rotated to vary a direction of thrust. Typically, the tilt wing includes an array of propellers mounted thereto and the propellers are usually spaced along a spanwise length of the tilt wing and driven by an engine and/or turbomachinery. The propellers typically necessitate transmission components that span across the spanwise length of the tilt wing. As a result, increasing a number of propellers often requires implementing multiple engines and/or increasing an amount of drive shafts implemented for transmission. Typically, the propellers are driven during all stages of operation (e.g., takeoff, landing, hovering, transition, and cruise) of the aircraft.

Examples disclosed herein utilize hybrid propulsion to enable fuel efficient and relatively lightweight aircraft. Further, examples disclosed herein can reduce propulsion complexity, thereby reducing production and part costs, as well as part number counts for increased production efficiency. Examples disclosed herein can also more efficiently transmit mechanical power produced by engines by reducing power transfer distances and/or spans. Examples disclosed herein utilize a tilt wing with first propellers driven by an engine and second propellers driven by at least one electric motor. The second propellers are positioned outboard (e.g., outboard from a fuselage) relative to the first propellers. The second propellers being electrically driven instead of being driven by the aforementioned engine greatly reduces mechanical complexity and, thus, cost of the overall propulsion system. The example second propellers can be idled and/or driven at a reduced power when the aircraft is in a cruising operation or mode to conserve and/or enable storage of energy. In some examples disclosed herein, inboard propellers (i.e., propellers that are closer to the fuselage) are primarily utilized during cruise while outboard propellers (i.e., propellers that are further from the fuselage) are utilized primarily for hovering and transition operations.

In some examples, the second propellers are folded (e.g., the second propellers are foldable) toward their respective nacelles and/or motor bodies during cruise, thereby reducing a drag coefficient of the aircraft. In some examples, a generator is operatively coupled between the electric motor(s) and the engine. In some such examples, a battery can be operatively coupled between the generator and the electric motor(s). For example, the battery supplies power to the second propellers during takeoff and landing and, thus, the engine can be implemented with decreased size and power requirements. In some examples, the battery can be trickle charged by the generator (e.g., during cruise).

As used herein, the term "tilt wing" refers to an assembly, device and/or component defining a wing body that rotates relative to a fuselage of an aircraft. The wing body can encompass a single wing body that extends across a fuselage or multiple wing bodies extending from the fuselage. As used herein, the term "aerodynamic body" refers to a fixed wing, tilt rotor, variable pitch, a tilt wing, etc. As used herein, the terms "motorpod" and "interchangeable propeller assembly" refer to an interchangeable section and/or component that includes at least a propeller and a motor. The interchangeable section and/or component can also include a speed controller and is generally removably couplable (e.g., detachable, etc.) to/from an aerodynamic body and/or a wing. As used herein, the term "propeller" refers to a rotor, fan or any other appropriate thrust device. As used herein, the term "engine" refers to a combustion engine, such as a jet engine, a gas engine, etc.

Figure 1A:
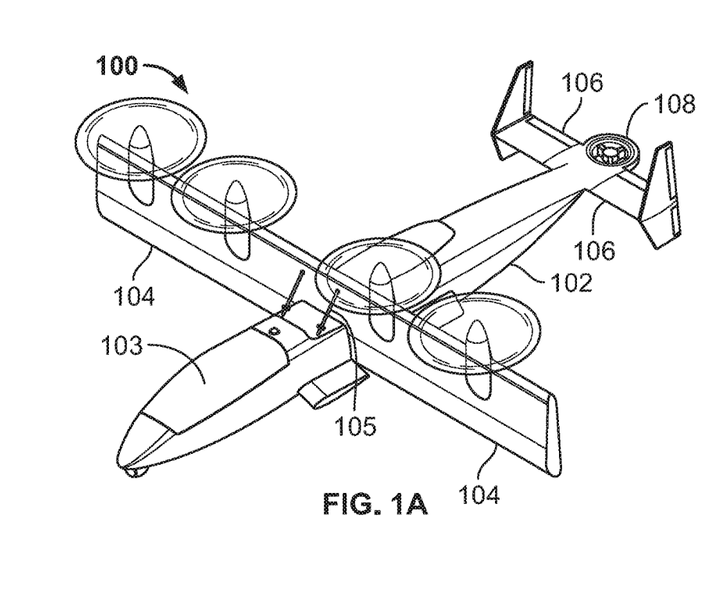
FIGS. 1A and 1B illustrate an example aircraft in accordance with teachings of this disclosure during hover and cruise, respectively.
Figure 1B:
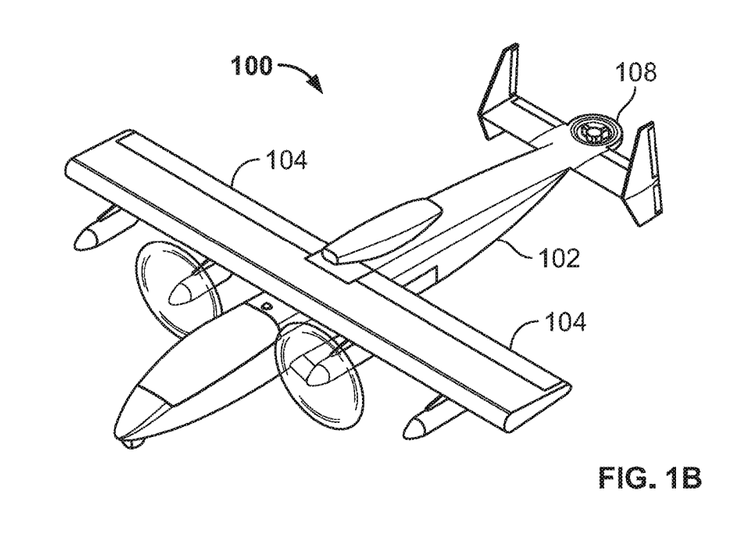

FIGS. 1A and 1B illustrate an example aircraft 100 in accordance with teachings of this disclosure during hover and cruise operations, respectively. FIG. 1A depicts the example aircraft 100 in a hovering and/or launch mode. The aircraft 100 of the illustrated example includes a fuselage 102 with a cockpit 103, a tilt wing (e.g., a rotatable tilt wing, a rotatable hovering wing, a full width tilt wing, etc.) 104 with a corresponding tilt actuator 105, tail fins 106, and a pitch fan (e.g., an electric pitch fan) 108. While the aircraft 100 is manned in this example, the aircraft 100 can, alternatively, be implemented as an unmanned aerial vehicle (UAV). Further, the aircraft 100 can be implemented as a vertical takeoff and landing (VTOL) aircraft, a short takeoff and landing (STOL) or a conventional takeoff and landing (CTOL) aircraft, for example.

In operation, the tilt wing 104 is rotatable about the tilt actuator 105 and the fuselage 102 to affect the direction of the thrust and, in turn, a direction of motion of the aircraft 100. In the illustrated view of FIG. 1A, the tilt wing 104 is shown oriented in a substantially vertical direction with respect to the ground, thereby moving the aircraft 100 in a relatively upward direction for a vertical takeoff or landing. In other words, the tilt wing 104 can be implemented for hovering operations or vertical takeoff.

In the illustrated example, the tail fins 106 and the pitch fan 108 are positioned on an aft portion or end of the fuselage 102 to facilitate stabilization of the aircraft 100 during hovering or takeoff operations. The example pitch fan 108 controls the pitch of the aircraft 100 and, thus, an orientation of aircraft 100 with respect to the ground. In particular, a negative pitch (e.g., nose of the aircraft pointed downward relative to the ground) generated by the pitch fan 108 counters a positive pitch (e.g., nose of the aircraft pointed upward relative to the ground) produced by the tilt wing 104 to stabilize the aircraft 100. In some examples, the pitch fan 108 is operated to resist undesired rotation and/or destabilization during VTOL operations. In some examples, the pitch fan 108 is removed (e.g., interchangeably removed) to configure the aircraft 100 for CTOL flight.

FIG. 1B illustrates the example aircraft 100 shown in FIG. 1A in a cruising operation. In the illustrated example, the tilt wing 104 is oriented in a relatively horizontal direction with respect to the ground. As a result, the tilt wing 104 generates a thrust substantially parallel to a spanwise length of the fuselage 102 and, in turn, propels the aircraft 100 in a forward direction (e.g., for cruise of the aircraft 100). In this example, the aforementioned pitch fan 108 is idled and/or turned off while the aircraft 100 is in cruise.

Figure 2:
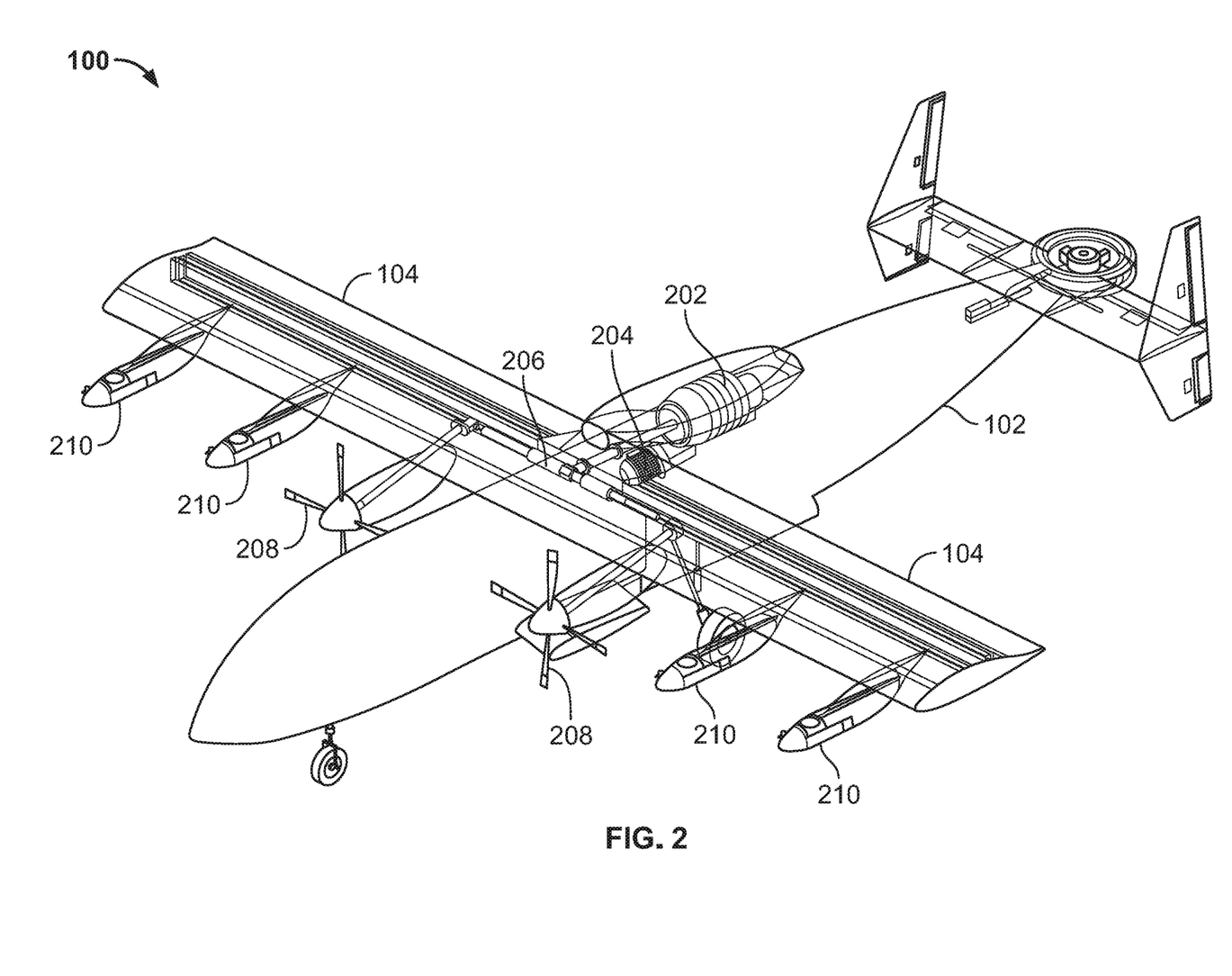
FIG. 2 is a perspective view of the example aircraft of FIG. 1.

FIG. 2 is a perspective view of the example aircraft 100 of FIGS. 1A and 1B with external surfaces shown as transparent to depict internal components. In the illustrated example, the aircraft 100 includes an engine 202, a generator 204, a transmission (e.g., a mechanical transmission) 206, first propellers (e.g., inboard propellers) 208, and second propellers (e.g., outboard propellers) 210 mounted on the tilt wing 104.

In the illustrated example, the engine 202 is positioned within the fuselage 102 and functions as a primary propulsion powerplant for the aircraft 100. In particular, the example engine 202 is implemented as a gas turbine engine that drives the transmission 206 and, in turn, the first propellers 208. However, the engine 202 can be implemented as any other appropriate type of engine including, but not limited to, a piston engine, a jet engine, a diesel engine, etc. While the example aircraft 100 has a single one of the engines 202 in this example, the aircraft 100 can include multiple engines instead. Further, any other appropriate type of transmission, movement device and/or system can be implemented instead.

In the illustrated example of FIG. 2, the generator 204 is positioned within the fuselage 102 and is implemented to transfer energy generated by the engine 202 to electrical components of the aircraft 100. In some other examples, however, the aircraft 100 can implement multiple ones of the generator 204 instead.

In the illustrated example of FIG. 2, the transmission 206 is positioned within the tilt wing 104 and extends generally along a spanwise length of the tilt wing 104 between the first propellers 208. In particular, a span of the example transmission 206 is dependent on the relative positions of the first propellers 208 to one another. In some examples, multiple pairs of the first propellers 208 are positioned on the tilt wing 104 and the transmission 206 extends between the furthest outboard pair of the first propellers 208.

In the illustrated example of FIG. 2, the first propellers 208 are mounted to and/or positioned on the tilt wing 104, which is shaped as one generally continuous body (e.g., a continuous aerodynamic body). The example second propellers 210 are folded and positioned on the tilt wing 104 outboard relative to the first propellers 208. Particularly, the first propellers 208 and second propellers 210 are placed as pairs on the tilt wing 104 with the second propellers 210 further from the fuselage 102 than the first propellers 208. In some other examples, however, the tilt wing 104 is implemented as multiple rotating bodies rather than a single rotating body.

Figure 3:
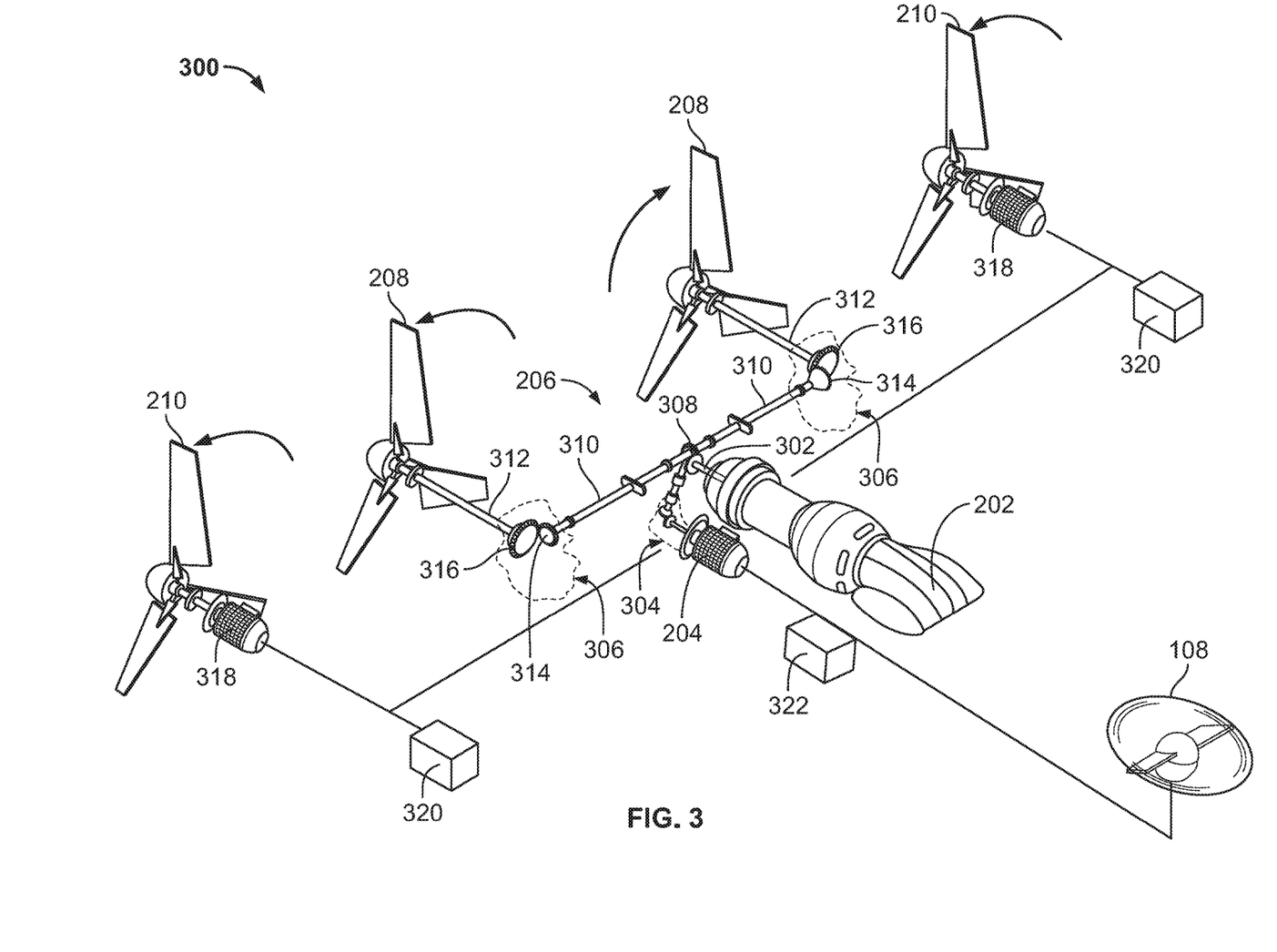
FIG. 3 illustrates an example hybrid propulsion system of the example aircraft of FIGS. 1A-2.

FIG. 3 illustrates an example hybrid propulsion system 300 of the example aircraft 100 shown in FIGS. 1A-2. The example hybrid propulsion system 300 moves the aircraft 100 during both flight (e.g., cruise) and hovering operations. As can be seen in FIG. 3, the hybrid propulsion system 300 is shown having the pitch fan 108, the engine 202, the generator 204, the transmission 206, the first propellers 208, and the second propellers 210. The hybrid propulsion system 300 further includes an output shaft (e.g., an engine drive shaft, an engine output shaft, etc.) 302, gear interfaces (e.g., gearbox, differentials, etc.) 304, 306, 308, driveshafts 310 (e.g., lateral driveshafts), propeller driveshafts 312, gears 314, 316, electric motors 318, batteries 320, and a selector (e.g., a selective hybrid propulsion drivetrain, a selective controller, a selection mechanism, etc.) 322.

To drive the first propellers 208 via the propeller driveshafts 312, the engine 202 rotates the output shaft 302 and, in turn, the driveshafts 310 via the gear interface 308. In the illustrated example, the driveshafts 310 are oriented perpendicular to the output shaft 302 and extend lengthwise along the tilt wing 104 to transfer mechanical movement of the engine 202 to the propeller driveshafts 312 and, thus, the first propellers 208. In particular, the gears 314 translate rotational movement of the driveshafts 310 to the gears 316 via the respective gear interfaces 306, thereby causing the propeller driveshafts 312 to rotate the first propellers 208. In some examples, a clutch is implemented to vary an engagement between the first gears 314 and the second gears 316. According to examples disclosed herein, only the two innermost propellers 208 are mechanically driven and the batteries 320 are mounted in relatively outer portions of wings or tails, thereby dispensing with a majority of the shafting due to a relatively localized electric powerplant. As a result, overall shafting lengths can be relatively short. In contrast, excess mechanical transmissions increase needs for harnessing and shafting. Thus, power source distributions of examples disclosed herein reduce necessitated weight, harnessing and/or transmissions. As will be appreciated by those having ordinary skill in the art, assigning an electric powertrain (e.g., using batteries 320) to a propulsion unit (i.e. propellers) that are located further form the power source than those having a mechanical or electro-mechanical powertrain is not limited to be applicable to a certain number or grouping of the propulsion units or any variations thereof.

To drive the second propellers 210, the generator 204 is operatively coupled to the engine 202 via the gear interface 304 to provide power to the electric motors 318. In some examples, the generator 204 is electrically coupled to the pitch fan 108 in addition to the electric motors 318. In this example, the batteries 320 store energy provided from the generator 204 for later use by the corresponding electric motors 318. In some such examples, the batteries 320 can be trickle charged by the generator 204. In other examples, however, the batteries 320 are not implemented. The example selector 322 controls whether electrical energy from the generator 204 and/or the batteries 320 is to be provided to the electric motors 318, (e.g., controlling whether the second propellers are driven or idled).

In the illustrated example of FIG. 3, the example hybrid propulsion system 300 changes the aircraft 100 between hovering and cruise operations and/or modes. In this example, during a takeoff/landing or hovering mode, the tilt wing 104 rotates relative to the fuselage 102 (shown in FIGS. 1A-2) to achieve a substantially vertical orientation. In this mode of operation, power generated by the engine 202 drives the first propellers 208 while the selector 322 enables electrical energy provided from the generator 204 and/or the batteries 320 to drive the second propellers 210 until the aircraft 100 reaches or maintains a desired altitude and/or hovering condition. In this example, to transition the aircraft 100 to a cruising mode once the aircraft 100 has reached or maintained a desired hover altitude, the tilt wing 104 is rotated to a generally horizontal orientation and, once a cruising mode is achieved, the selector 322 shuts off and/or idles the second propellers 210 and the pitch fan 108 so that the first propellers 208 can be operated for cruise and/or flight. In some examples, the second propellers 210 are folded toward respective nacelles and/or motor bodies during cruise to reduce drag of the aircraft 100.

Figure 4A:
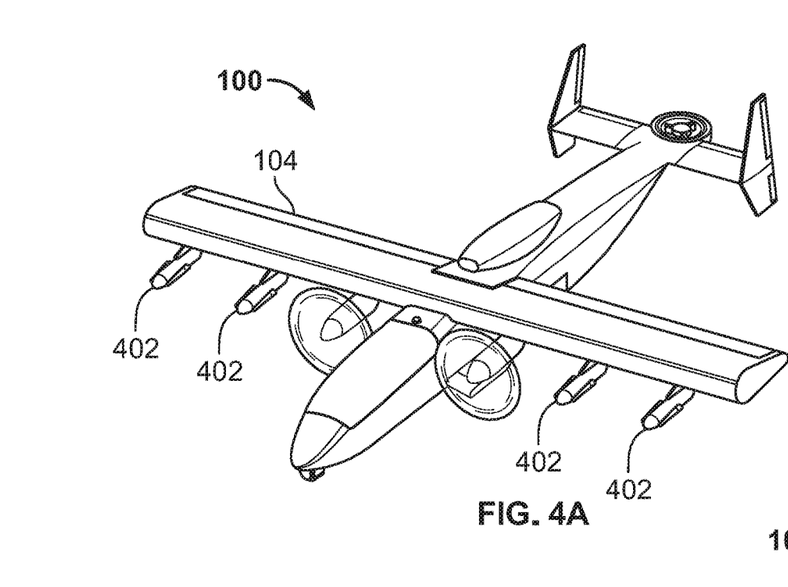
FIGS. 4A and 4B illustrate component interchangeability that can be implemented in examples disclosed herein.

Turning to FIGS. 4A and 4B, component interchangeability that can be implemented in examples disclosed herein is shown. In the illustrated example of FIG. 4A, the second propeller 210, the electric motor 318, and the battery 320 shown in FIG. 3 define an interchangeable propeller assembly (e.g., a motorpod, a removable propeller, etc.) 402. The example interchangeable propeller assembly 402 may also include a speed controller to vary a rotational speed of the second propeller 210. In some examples, the battery 320 is not included in the interchangeable propeller assembly 402. In the illustrated example, the example aircraft 100 is depicted in a cruising mode with four of the interchangeable propeller assemblies 402 implemented on the tilt wing 104. In this example, the interchangeable propeller assemblies 402 are removably couplable to the tilt wing 104 (e.g., via quick disconnect wiring, spring-loaded connectors and/or mechanical connectors) to vary an operating mode of the aircraft 100. In particular, any number of pairs of interchangeable propeller assemblies 402 can be added to or removed from the aircraft 100 depending on the application, need, and/or desired operation of the aircraft 100.

Figure 4B:
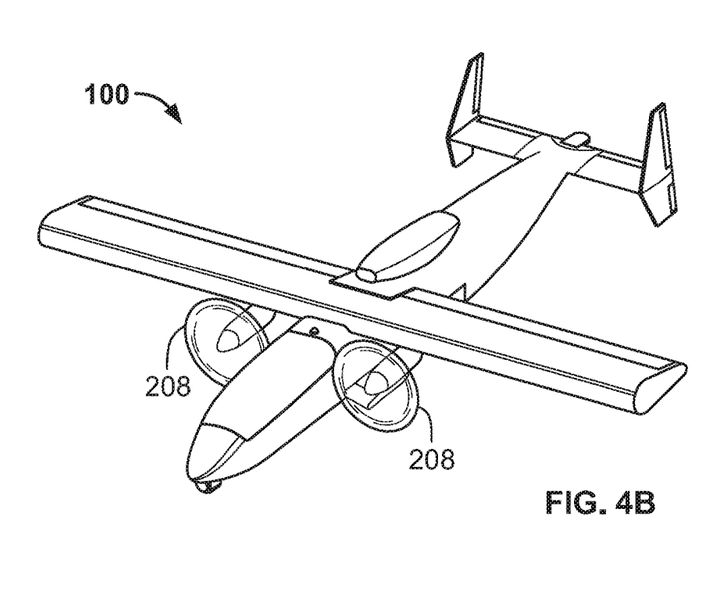

Turning to FIG. 4B, the example aircraft 100 is shown with the interchangeable propeller assemblies 402 and the pitch fan 108 removed (e.g., temporarily removed). In this example, the aircraft 100 is configured for STOL and/or CTOL operations in which the aircraft 100 is propelled by the first propellers 208 without the presence of the second propellers 210. In this example, removal of the interchangeable propeller assemblies 402 and pitch fan 108 significantly reduces weight of the example aircraft 100 and, in turn, increases payload capacity, mission range, and fuel efficiency.

Figure 5:
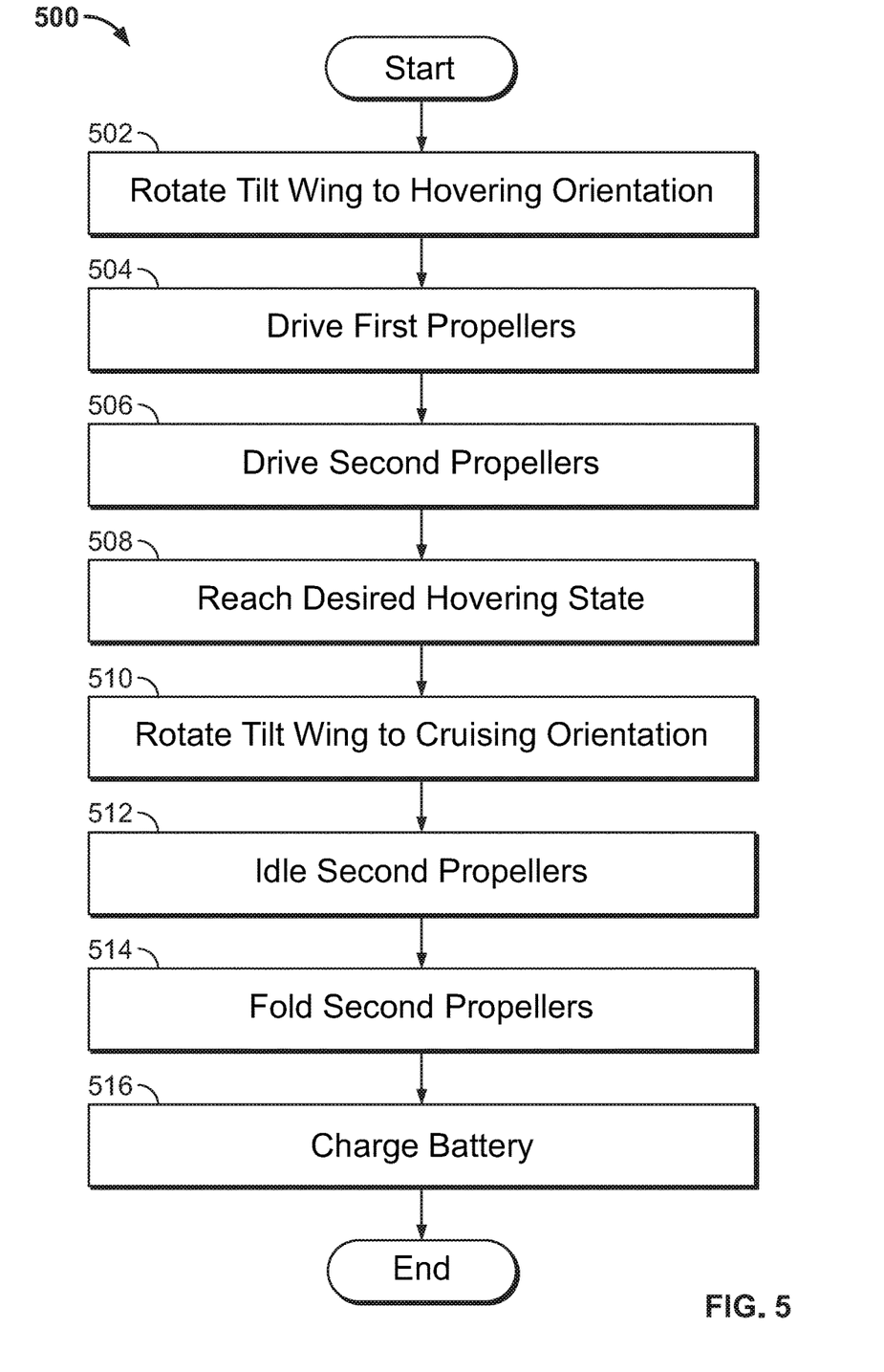
FIG. 5 is a flowchart representative of an example method to operate examples disclosed herein.

A flowchart representative of an example method 500 to operate the tilt wing aircraft 100 is shown in FIG. 5. The example method 500 of FIG. 5 begins as the aircraft 100 is being deployed and/or launched. In the illustrated example, an orientation of the tilt wing 104 varies a direction of thrust on the aircraft 100 and, thus, the flight direction of the aircraft 100.

At block 502, the tilt wing 104 is rotated to a hovering orientation. That is, the tilt wing 104 is rotated about the fuselage 102 to a substantially vertical orientation with respect to the ground, thereby directing the thrust from the first propellers 208 and the second propellers 210 to propel the aircraft 100 generally upward.

At block 504, the engine 202 drives the first propellers 208. In particular, the transmission 206 transfers power between the engine 202 and the first propellers 208.

At block 506, at least one of the electric motors 318 drives the second propellers 210. In particular, at least one of the electric motors 318 is powered by the generator 204 and/or the batteries 320.

At block 508, the first propellers 208 and the second propellers 210 are driven until the aircraft 100 reaches a desired hovering state and/or altitude. For hovering operations, the example aircraft 100 maintains the desired altitude by driving both the first propellers 208 and the second propellers 210.

At block 510, the tilt wing 104 is rotated to a cruising orientation. In particular, the example tilt wing 104 is rotated relative to the fuselage 102 to a generally horizontal orientation with respect to the ground, thereby directing the thrust from the first propellers 208 and the second propellers 210 to propel the aircraft 100 in a forward direction.

At block 512, the second propellers 210 are idled. In some examples, power from the generator 204 and/or the batteries 320 is no longer provided to the electric motors 318. In other words, the second propellers 210 are turned off.

At block 514, the second propellers 210 are folded toward a respective motor body and/or nacelle to reduce a drag coefficient of the aircraft 100 during cruise.

At block 516, the batteries 320 are charged by the generator 204 while the second propellers 210 are idled. In this example, the batteries 320 are trickle charged during cruise.

Figure 6:
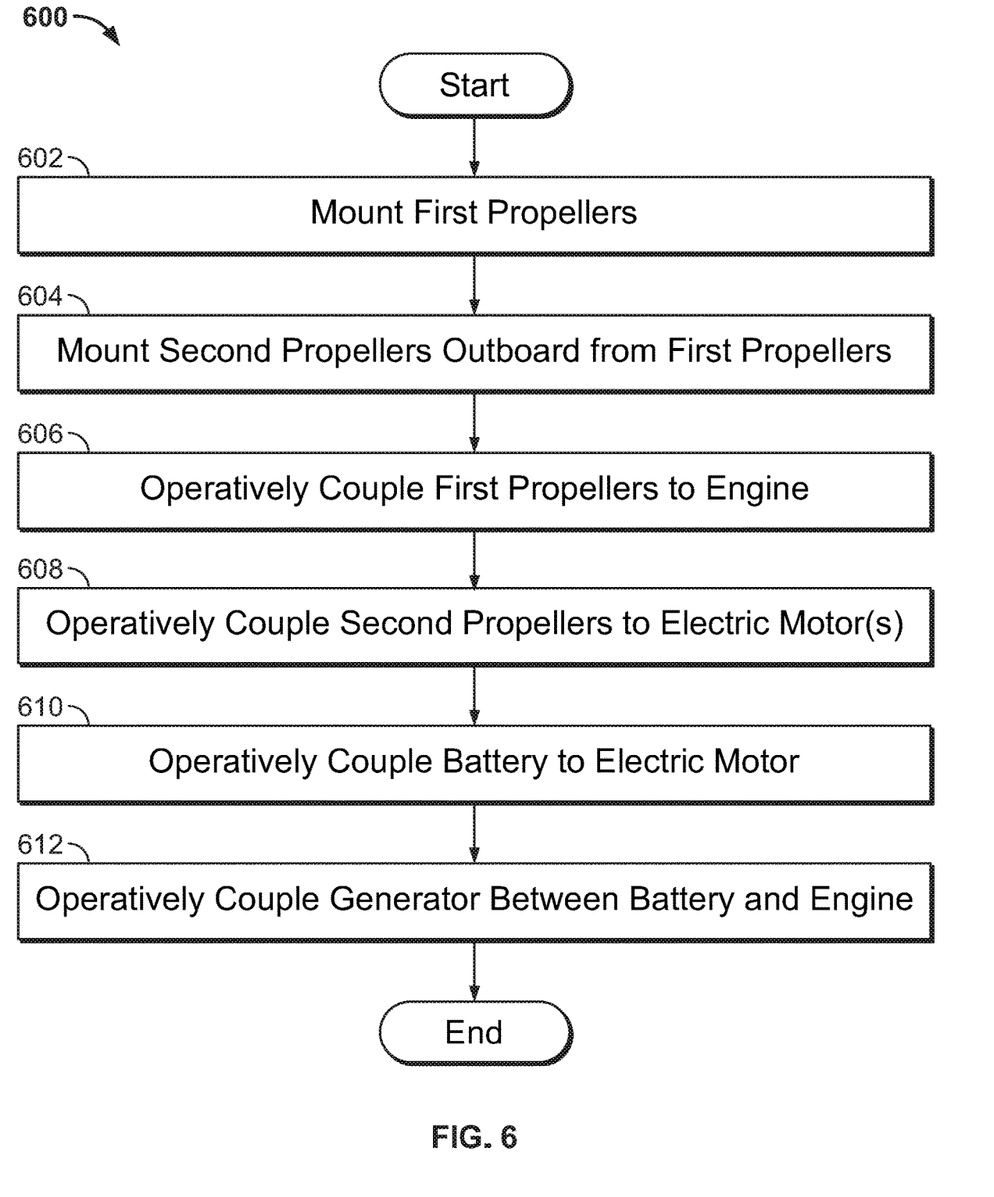
FIG. 6 is a flowchart representative of an example method to produce examples disclosed herein.

A flowchart representative of an example method 600 to produce examples disclosed herein is shown in FIG. 6. The example method of FIG. 6 begins as the tilt wing 104 is being implemented on the aircraft 100.

At block 602, the first propellers 208 are mounted on the tilt wing 104. In this example, the first propellers 208 are mounted as pairs in which a left and a right propeller of each pair is mounted on the corresponding left and right sides of the fuselage 102.

At block 604, the second propellers 210 are mounted on the tilt wing 104 outboard from the respective first propellers 208. In some examples, the second propellers 210 are removably couplable to and/or interchangeable with the tilt wing 104.

At block 606, the first propellers 208 are operatively coupled to the engine 202.

At block 608, the second propellers 210 are operatively coupled to at least one of the respective electric motors 318.

At block 610, one or more of the batteries 320 are operatively coupled to the at least one electric motor 318. In some examples, the batteries 320 are not implemented.

At block 612, the generator 204 is operatively coupled between the battery 320 and the engine 202. Additionally or alternatively, the generator 204 is operatively coupled between the engine 202 and at least one of the electric motors 318 (e.g., the second propellers 210 are directly wired to the generator 204). In some examples, the generator 204 is implemented to trickle charge the battery 320.

Figure 7:
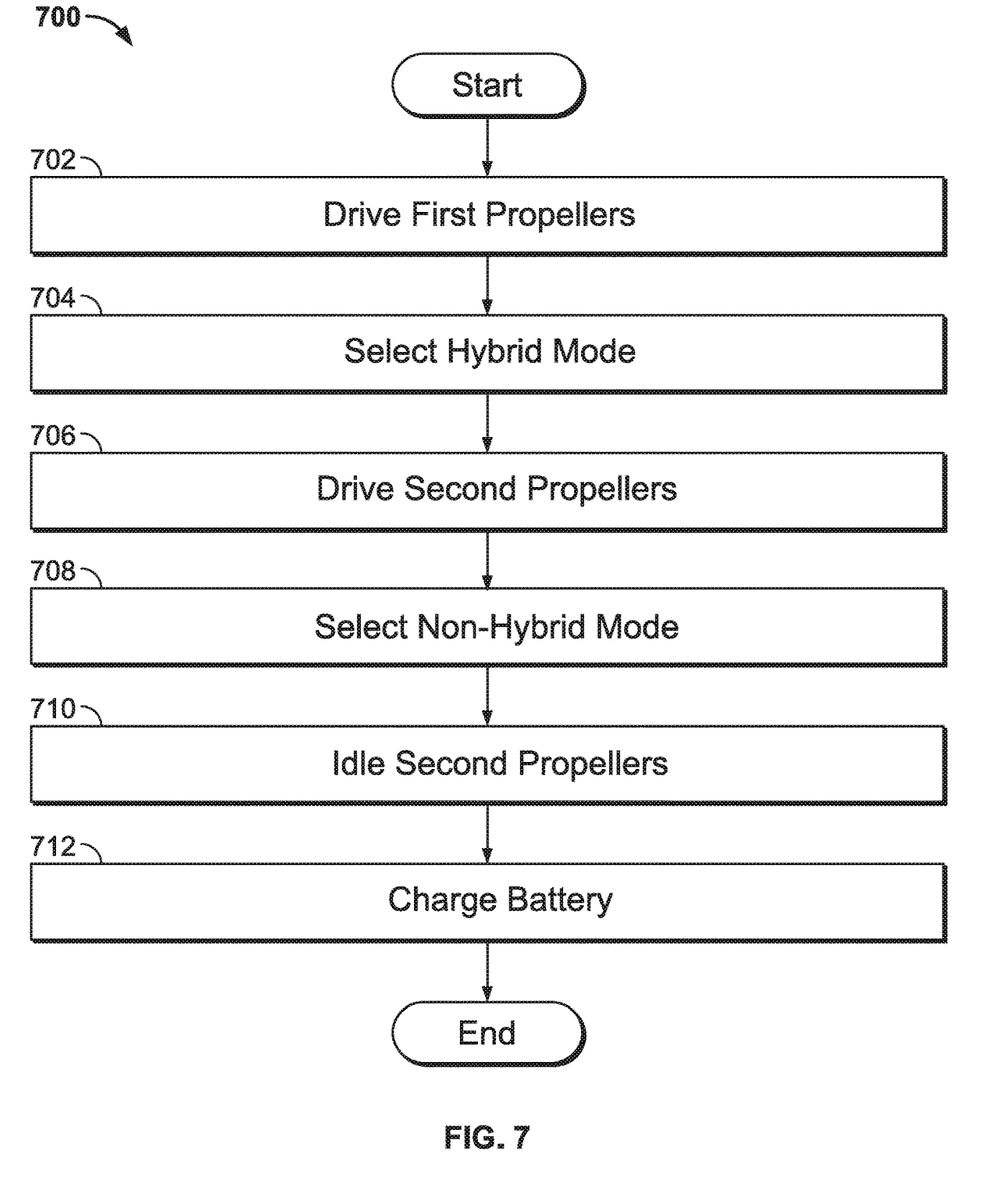
FIG. 7 is a flowchart representative of an example method to implement examples disclosed herein.

A flowchart representative of an example method 700 to power the hybrid propulsion system 300 is shown in FIG. 7. The example method 700 of FIG. 7 begins as the hybrid propulsion system 300 is being deployed. In the illustrated example, the selector 322 control whether the second propellers 210 are driven based on whether the hybrid propulsion system 300 is operating in hybrid mode (e.g., electrically-driven and engine-driven propellers operated simultaneously) or non-hybrid mode (e.g., engine-driven propellers operated alone).

At block 702, the engine 202 drives the first propellers 208. In particular, the transmission 206 transfers power between the engine 202 and the first propellers 208.

At block 704, the selector 322 selects a hybrid mode of operation of the hybrid propulsion system 300. In some examples, hybrid mode is selected for hovering, takeoff and/or landing of the aircraft 100.

At block 706, the selector 322 directs at least one of the electric motors 318 to drive the second propellers 210. In particular, at least one of the electric motors 318 is powered by the generator 204 and/or the batteries 320.

At block 708, the selector 322 selects a non-hybrid mode of operation for the hybrid propulsion system 300. In some examples, the non-hybrid mode is selected during cruise of the aircraft 100. In other examples, the non-hybrid mode is selected when the interchangeable propeller assemblies 402 are removed.

At block 710, the selector 322 directs the second propellers 210 to be idled and/or shut off during non-hybrid mode. In some examples, the second propellers 210 are folded when idled and/or shut off.

At block 712, the batteries 320 are trickle charged by the generator 204 while the second propellers 210 are idled and/or shut off.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example 1 includes a propulsion system for an aircraft. The propulsion system includes an engine, an electric motor, a first propeller mounted to an aerodynamic body of the aircraft, the first propeller driven by the engine, a second propeller mounted to the aerodynamic body and positioned outboard relative to the first propeller, the second propeller driven by the electric motor, and a selector to control whether the propulsion system is operated in a hybrid mode in which the first and second propellers are driven Example 2 includes the propulsion system as defined in example 1, where the selector includes a selective hybrid propulsion drivetrain.

Example 3 includes the propulsion system as defined in example 1, where the second propeller is mounted to an interchangeable propeller assembly that is removably couplable from the aerodynamic body via a mechanical connector.

Example 4 includes the propulsion system as defined in example 1, where at least one of the first or second propellers is foldable.

Example 5 includes the propulsion system as defined in example 1, further including a generator operatively coupled between the electric motor and the engine.

Example 6 includes the propulsion system as defined in example 5, further including a battery operatively coupled between the generator and the electric motor, wherein the battery is trickle charged by the generator.

Example 7 includes the propulsion system as defined in example 5, further including a tilt rotor operatively coupled to the generator.

Example 8 includes a method of providing propulsion to an aircraft. The method includes driving, via an engine, first propellers of an aerodynamic body, and selectively driving, via at least one electric motor, second propellers of the aerodynamic body based on the whether the aircraft is operating in a hybrid mode, the second propellers are positioned outboard from the first propellers.

Example 9 includes the method as defined in example 8, further including folding the second propellers toward respective interchangeable propeller assemblies when the second propellers are idled.

Example 10 includes the method as defined in example 8, further including enabling the hybrid mode in response to at least one of hovering, takeoff or landing of the aircraft.

Example 11 includes the method as defined in example 8, further including trickle charging batteries operatively coupled to the at least one electric motor.

Example 12 includes the method as defined in example 8, further including removing an interchangeable propeller assembly from the aircraft to vary a flight mode of the aircraft, the interchangeable propeller assembly including one of the second propellers.

Example 13 includes propulsion system for a tilt wing of an aircraft. The propulsion system includes a wing body, first propellers mounted on the tilt wing, where the first propellers are to be driven by an engine, second propellers mounted on the tilt wing, where the second propellers are positioned outboard relative to the first propellers, and where the second propellers are to be driven by at least one electric motor, and a selector to control whether the propulsion system is operated in a hybrid mode in which the first and second propellers are driven.

Example 14 includes the propulsion system as defined in example 13, further including a generator operatively coupled between the at least one electric motor and the engine.

Example 15 includes the propulsion system as defined in example 14, further including a battery operatively coupled between the generator at the at least one electric motor.

Example 16 includes the propulsion system as defined in example 15, where the battery includes a first battery operatively coupled to a first one of the second propellers, and further including a second battery operatively coupled to a second one of the second propellers.

Example 17 includes the propulsion system as defined in example 14, further including a tilt rotor operatively coupled to the generator.

Example 18 includes the propulsion system as defined in example 13, where the second propellers are mounted to respective interchangeable propeller assemblies that are removably couplable from the tilt wing via mechanical connectors.

Example 19 includes the propulsion system as defined in example 13, where the second propellers are foldable relative to respective interchangeable propeller assemblies.

Example 20 includes the propulsion system as defined in example 13, where the wing body extends across a fuselage of the aircraft.

From the foregoing, it will be appreciated that example methods, apparatus and articles of manufacture have been disclosed that are cost-effective, quick to implement and can reduce a mechanical complexity of an aircraft. Further, examples disclosed herein can reduce weight of an aircraft, and, thus, increase fuel efficiency.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A propulsion system for an aircraft, the propulsion system comprising:
    an engine;
    an electric motor;
    a first propeller mounted to an aerodynamic body of the aircraft, the first propeller driven by the engine;
    a second propeller mounted to the aerodynamic body and positioned outboard relative to the first propeller, the second propeller driven by the electric motor; and
    a selector to:
        control whether the propulsion system is operated in a hybrid mode in which the aerodynamic body is in a first position and the first and second propellers are driven, the second propeller disabled when the aerodynamic body is in a second position, the first position rotationally displaced from the second position, and
        disable a pitch fan positioned on an aft portion of the aircraft when the aerodynamic body is in the second position.

2. The propulsion system as defined in claim 1, wherein the second propeller is mounted to an interchangeable propeller assembly that is removably couplable from the aerodynamic body.

3. The propulsion system as defined in claim 1, wherein at least one of the first propeller or the second propeller is foldable.

4. The propulsion system as defined in claim 1, further including a generator operatively coupled between the electric motor and the engine.

5. The propulsion system as defined in claim 4, further including a battery operatively coupled between the generator and the electric motor, wherein the battery is trickle charged by the generator.

6. The propulsion system as defined in claim 1, wherein the pitch fan is electrically driven.

7. A method of providing propulsion to an aircraft, the method comprising:

driving, via an engine, first propellers of an aerodynamic body;

selectively driving, via at least one electric motor, second propellers of the aerodynamic body based on whether the aircraft is operating in a hybrid mode, the second propellers outboard from the first propellers, the first and second propellers driven when the aerodynamic body is in a first position, the second propellers disabled when the aerodynamic body is in a second position, the first position rotationally displaced from the second position, and disabling a pitch fan positioned on an aft portion of the aircraft when the aerodynamic body is in the second position.

8. The method as defined in claim 7, further including folding the second propellers toward respective interchangeable propeller assemblies when the second propellers are disabled.

9. The method as defined in claim 7, further including enabling the hybrid mode in response to at least one of hovering, takeoff or landing of the aircraft.

10. The method as defined in claim 7, further including trickle charging batteries operatively coupled to the at least one electric motor.

11. The method as defined in claim 7, further including removing an interchangeable propeller assembly from the aircraft to vary a flight mode of the aircraft, the interchangeable propeller assembly including one of the second propellers.

12. A propulsion system for a tilt wing of an aircraft, the propulsion system comprising:

a wing body;

first propellers mounted on the wing body, the first propellers to be driven by an engine;

second propellers mounted on the wing body, the second propellers positioned outboard relative to the first propellers, the second propellers to be driven by at least one electric motor; and a selector to:

control whether the propulsion system is operated in a hybrid mode in which the wing body is in a first position and the first and second propellers are driven, the second propellers disabled when the wing body is in a second position, the first position rotationally displaced from the second position, and disable a pitch fan positioned on an aft portion of the aircraft when the wing body is in the second position.

13. The propulsion system as defined in claim 12, further including a generator operatively coupled between the at least one electric motor and the engine.

14. The propulsion system as defined in claim 13, further including a battery operatively coupled between the generator and the at least one electric motor.

15. The propulsion system as defined in claim 14, wherein the battery includes a first battery operatively coupled to a first one of the second propellers, and further including a second battery operatively coupled to a second one of the second propellers.

16. The propulsion system as defined in claim 12, wherein the second propellers are mounted to respective interchangeable propeller assemblies that are removably coupled to the wing body.

17. The propulsion system as defined in claim 16, wherein the second propellers are foldable relative to the respective interchangeable propeller assemblies.

18. The propulsion system as defined in claim 12, wherein the wing body extends across a fuselage of the aircraft.

* * * * *